United States Patent
Nagarathinam

(10) Patent No.: US 11,507,981 B2
(45) Date of Patent: *Nov. 22, 2022

(54) AUTOMATED LISTS

(71) Applicant: Walmart Apollo, LLC, Bentonville, AR (US)

(72) Inventor: Arun Prasad Nagarathinam, Santa Clara, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/074,417

(22) Filed: Oct. 19, 2020

(65) Prior Publication Data

US 2021/0035162 A1 Feb. 4, 2021

Related U.S. Application Data

(63) Continuation of application No. 14/472,897, filed on Aug. 29, 2014, now Pat. No. 10,810,626.

(51) Int. Cl.
*G06Q 30/00* (2012.01)
*G06Q 30/02* (2012.01)

(52) U.S. Cl.
CPC ..... *G06Q 30/0269* (2013.01); *G06Q 30/0246* (2013.01)

(58) Field of Classification Search
CPC ............ G06Q 30/0269; G06Q 30/0246
See application file for complete search history.

(56) References Cited

U.S. PATENT DOCUMENTS 7,181,419 B1 * 2/2007 Mesaros ............ G06Q 30/0224
705/26.2
8,117,085 B1 2/2012 Smith
(Continued)

FOREIGN PATENT DOCUMENTS

WO 2013095333 6/2013

OTHER PUBLICATIONS

Y. Wan and G. Peng, "What's NextforShopbots?,"in Computer, vol. 43, No. 5, pp. 20-26, May 2010, doi: 10.1109/MC.2010.93. (Year: 2010).*

(Continued)

*Primary Examiner* — Sun M Li
(74) *Attorney, Agent, or Firm* — Bryan Cave Leighton Paisner LLP

(57) ABSTRACT

A system including one or more processors and one or more non-transitory computer-readable media storing computing instructions configured to run on the one or more processors and perform: receiving transaction data comprising items previously purchased; comparing the first item to the second item; identifying the first item to be related to the second item; aggregating the first product type and the second product type into a first category bundle having a first theme defined by the first and second product types; assigning a first affinity score to the first and second items based on the transaction data; detecting the first item as being a first item of interest; and when the first affinity score of the first item exceeds a threshold, displaying, to the user while browsing the one or more websites, the first category bundle comprising the first and second items. Other embodiments are described.

20 Claims, 5 Drawing Sheets

(56) References Cited

U.S. PATENT DOCUMENTS

| | | | |
|---|---|---|---|
| 8,290,818 B1 | 10/2012 | Levitan et al. | |
| 8,370,203 B2 | 2/2013 | Dicker | |
| 8,438,052 B1 | 5/2013 | Chanda | |
| 9,218,607 B1 * | 12/2015 | Steves | G06Q 30/0201 |
| 2001/0034658 A1 | 10/2001 | Silva et al. | |
| 2001/0051932 A1 | 12/2001 | Srinivasan et al. | |
| 2003/0220830 A1 | 11/2003 | Myr | |
| 2006/0047563 A1 * | 3/2006 | Wardell | G06Q 30/02 |
| | | | 705/14.67 |
| 2010/0114783 A1 | 5/2010 | Spolar | |
| 2012/0203669 A1 | 8/2012 | Borsch et al. | |
| 2012/0226573 A1 | 9/2012 | Zakas et al. | |
| 2012/0245988 A1 * | 9/2012 | Pace | G06Q 30/0204 |
| | | | 705/14.1 |
| 2012/0323727 A1 | 12/2012 | Batra et al. | |
| 2013/0124330 A1 * | 5/2013 | Doughty | G06Q 30/0267 |
| | | | 705/14.66 |
| 2013/0191377 A1 | 7/2013 | Zelevinsky et al. | |
| 2014/0067513 A1 | 3/2014 | Arora | |
| 2016/0321284 A1 * | 11/2016 | Spears | G06F 16/285 |

OTHER PUBLICATIONS

Guralnik and G. Karypis, "A scalable algorithm for clustering sequential data," Proceedings 2001 IEEE International Conference on Data Mining, 2001, pp. 179-186, doi: 10.1109/ICDM.2001.989516. (Year: 2001).*

L. Guo-rong and Z. Xi-zheng, "Collaborative Filtering Based Recommendation System for Product Bundling," 2006 International Conference on Management Science and Engineering, 2006, pp. 251-254, doi: 10.1109/ICMSE.2006.313887. (Year: 2006).*

* cited by examiner

AUTOMATED LISTS

CROSS-REFERENCE TO RELATED APPLICATIONS

This application is a continuation of U.S. application Ser. No. 14/472,897, filed Aug. 29, 2014, to-be-issued as U.S. Pat. No. 10,810,626. U.S. application Ser. No. 14/472,897 and to-be-issued U.S. Pat. No. 10,810,626 are incorporated herein by reference in their entirety.

BACKGROUND

In efforts to increase customer convenience and boost sales, retail websites may attempt to "cluster" complementary products in groups based on shared purchase frequency or some other connection between the products. Products that are commonly purchased together or within a short period of one another may thus be clustered together. Products that have been clustered together may subsequently be expected to be purchased together by other potential customers. For example, it may be observed that when or shortly after consumers purchase an electronic tablet, a high percentage of those consumers also purchase a case for an electronic tablet. Such an observation may indicate that future purchasers of electronic tablets may likewise be interested in cases for tablets, so such products can be clustered together.

A typical strategy for implementing clustered products includes displaying "recommended" products to a user, where the recommended products are clustered with a product that the user is viewing. By offering such clustered products together, retailers may more effectively target potential purchasers of those clustered products, thereby generating increased sales and elevating customer satisfaction. Some retailers have offered clustered products for purchase as a package (i.e., the retailer may offer a discount if all products in the cluster are purchased together). Such a sales strategy has also been known to increase sales.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
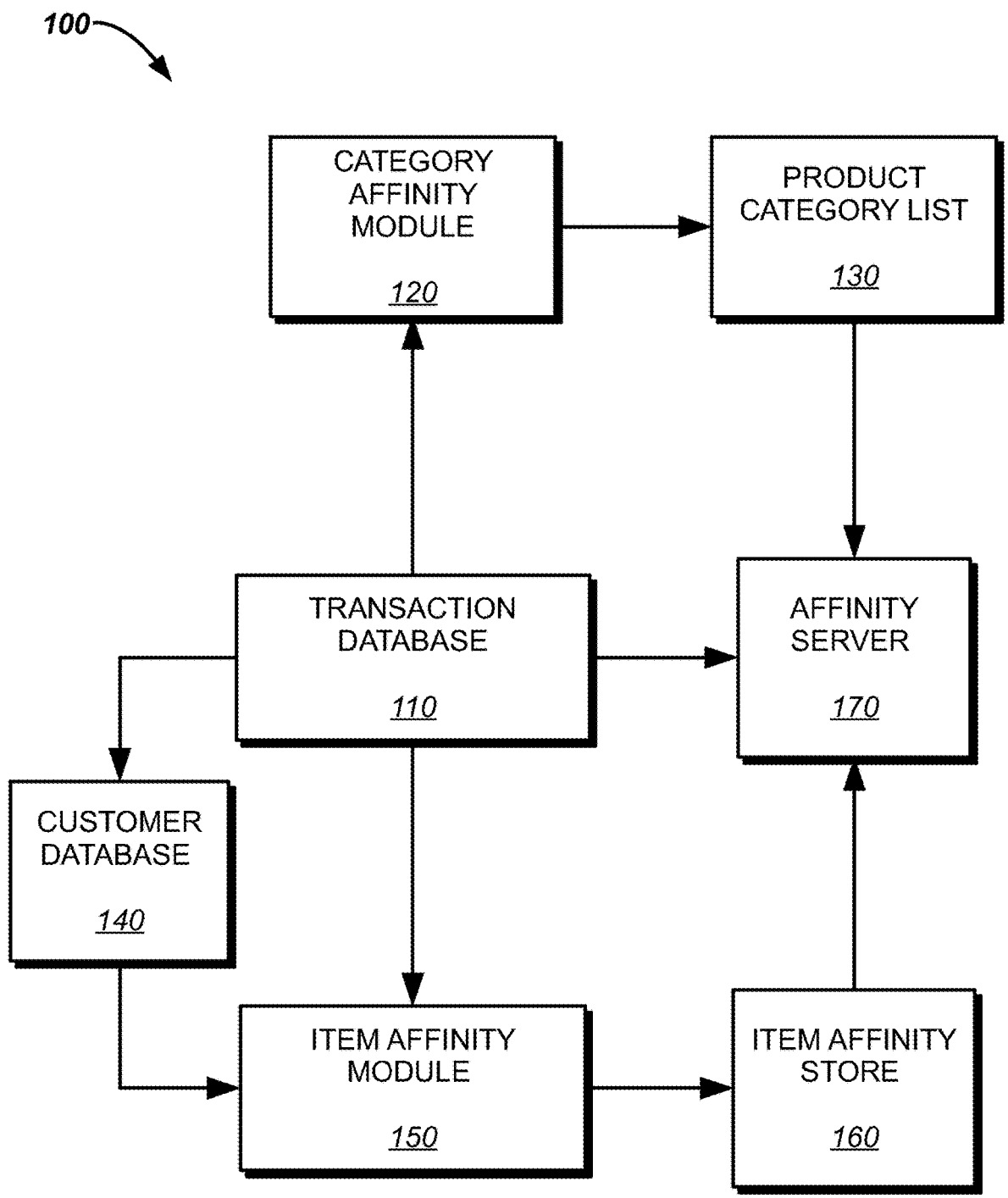
FIG. 1 is a block diagram illustrating software components of a product category clustering system according to an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure extends to methods, systems, and computer programs for clustering complementary and/or related products to encourage customers to purchase the complementary and/or related products. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowchart and block diagrams in the attached figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Embodiments of the present disclosure are adapted to generate and present clusters of related items for users. In the context of this disclosure, and as will be further detailed below, items may be "related" as evinced by shopping and/or browsing patterns of users, through commonalities such as product categories, manufacturers, and service providers, or by other means of grouping items. "Items" may represent products or services. Such products may include, but are not limited to: groceries, foods, office supplies, clothing wares, any other fungible goods sold by a retailer, commercial products, industrial goods, and the like. Services may include, but are not limited to: professional services, financial services, medical services, business services, educational services, travel, lodging services, repair services, and other types of services. In general, a provider of products and/or services may be referred to herein as a merchant or retailer. A merchant may typically operate and manage the systems disclosed and described herein or may enter into service agreements with a third party to operate and manage the systems.

Figure 2:
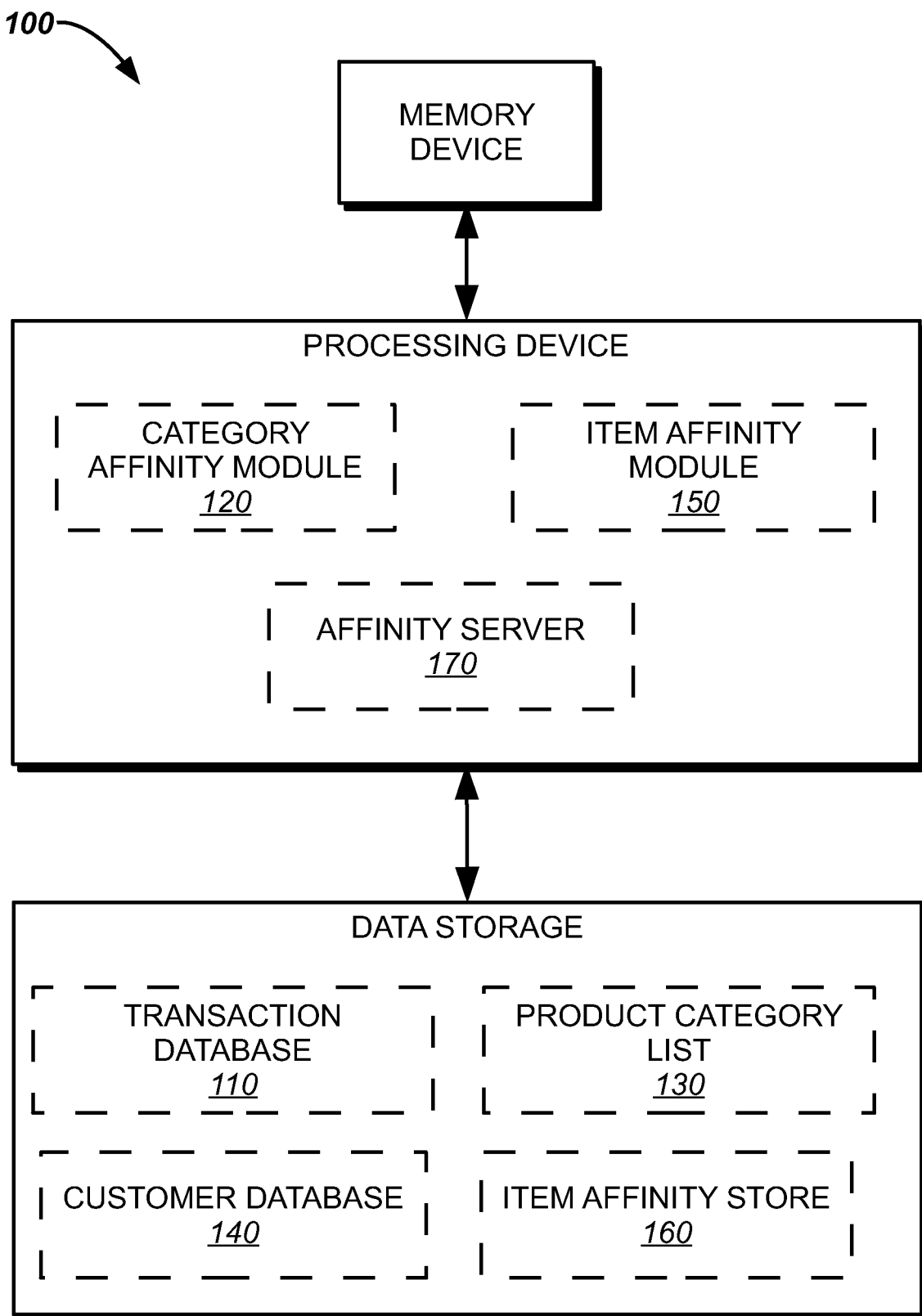
FIG. 2 is a block diagram illustrating components of product category clustering system in accordance with some embodiments of the present disclosure.

FIGS. 1 and 2 are block diagrams illustrating exemplary embodiments of a product category clustering system 100 of the present disclosure. According to an embodiment, product category clustering system 100 comprises a transaction database 110, category affinity module 120, product category list 130, customer database 140, item affinity module 150, item affinity store 160, and affinity server 170. In various embodiments, transaction database 110, category affinity module 120, product category list 130, customer database 140, item affinity module 150, item affinity store 160, and affinity server 170 are implemented as computer-readable instructions and/or data stored in a memory to direct a computer processor to carry out operations as described herein.

In embodiments, transaction database 110 comprises a record of transactions made by a retailer to consumers. In various embodiments, transaction database 110 comprises a record of selected subsets of all transactions carried out by a retailer. For example, in one embodiment, transaction database 110 comprises a record of all transactions carried out on a retailer's website. In another embodiment, transaction database 110 comprises a record of transactions carried out during a selected time frame. According to embodiments, transaction database 110 includes information about specific retail transactions, including but not limited to: an identification of the product sold, a category of the product sold, identification of the customer involved in the transaction, and other details of the purchase. New entries may be added to transaction database 110 as additional transactions are completed by the retailer and may thus comprise a relatively current record of completed sales.

According to embodiments, category affinity module 120 is implemented in one or more computer processors and an operational memory that includes data and/or computer-readable instructions to direct the computer processor to analyze transaction database 110 to identify categories of products that exhibit an affinity to each other. As used herein, the term "affinity" means an observed or calculated link or association between two or more products or product categories as demonstrated by purchases of the two or more products. In particular, an affinity between two or more products and/or product categories may be observed by detecting that such products are commonly purchased together or closely following one another by a consumer. In embodiments, category affinity module 120 is adapted to detect purchasing patterns across all customers to identify affinity between any set of products and/or categories. As used herein, a "category" of products represents a set of products that are grouped by product type. In embodiments, all products under a single category may be viewed as interchangeable in terms of basic function. For example, a product category may be called "baby cribs" and include various brands and models of baby cribs. As another example, a product category may be called "televisions" and include various brands and models of televisions.

According to embodiments, category affinity module 120 uses an affinity algorithm to identify affinity between products and/or categories. Affinity may be found among product categories that consumers typically purchase together. For example, it may be observed that consumers typically purchase a baby crib, a baby car seat, a stroller, and other related items that one might purchase around the birth of a baby. After a sufficient number of customers have purchased items from those categories together, the categories "baby cribs," "baby car seats," "strollers," and other identified product categories may be aggregated into a bundle. In an embodiment, such a bundle may be given a descriptive title, such as "newborn essentials." As another example, consumers may typically purchase a pet toy, a pet food dish, pet food, and products from other related product categories prior to or upon acquiring a new pet. Accordingly, the categories "pet toys," "pet food dishes," "pet food," and other identified product categories may be aggregated into a bundle. In various embodiments, analysis of transaction data may also reveal other trends that were not as readily apparent but are still made manifest upon aggregating shopping patterns across numerous customers. In one embodiment, the number of categories in a category bundle is limited to a selected quantity. For example, a category bundle may be limited to four categories. Such categories may be selected by sales volume, degree of affinity, or by other factors. For example, categories to be included in a bundle may comprise the four best-selling categories. In one embodiment, the categories in a bundle are selected dynamically for each customer based on specific customer data, including past sales, demographic profiles, and the like.

In embodiments, category affinity module 120 transmits data relating bundled categories to product category list 130. In one embodiment, such data includes the constituent product categories in the bundle and the individual products that make up each category. Additional data may include identification codes for the manufacturer of each product and identifying information regarding the consumers who purchased each product. Additional data may further include information regarding the transaction itself, such as the location of the purchase, the time and/or date of the transaction, and the like. According to embodiments, product category list 130 comprises a memory adapted to store a record of bundles of products and/or product categories found to show affinity one with another. Continuing a previous example, product category list 130 may store a bundle titled "newborn essentials" that contains various product categories that were found by category affinity module 120 to have affinity one with another.

In embodiments, customer database 140 comprises a data store of information relating to customers that have made or may make purchases at a retailer, or for whom the retailer has data for other reasons. According to embodiments, such information may include demographic data regarding the customers, i.e., age, location of residence, income level, gender, education level, race, and any additional factors comprising the customer's demographic profile. Such customer demographic data may be gathered from transaction database 110 or other data sources.

According to embodiments, item affinity module 150 is implemented in one or more computer processors and an operational memory that includes data and/or computer-readable instructions to direct the computer processor to analyze transaction database 110 and customer database 140 to identify affinities between customer demographic profile factors and particular items. For example, a particular item may comprise a specific brand or model with a category. Customers having various demographic profiles may show, in the aggregate, purchasing tendencies toward certain brands or models within a selected product category. Embodiments of item affinity module 150 can use affinity algorithms to identify such tendencies. Relationships between an item and a single demographic factor or combinations of demographic factors may be observed and recorded by item affinity module 150.

In embodiments, item affinity module 150 may be selectively given an affinity threshold, such that if any identified relationship between a particular item and a demographic profile is found to have an affinity higher than the threshold, item affinity module 150 identifies and records the relationship. In an embodiment, item affinity module 150 is adapted to transmit data regarding such relationships to item affinity store 160. According to embodiments, item affinity store 160 is adapted to receive and store data relating to observed affinities between customer demographic factors and products. In an embodiment, item affinity store 160 can record affinity strengths between the demographic factors and products.

According to embodiments, affinity server 170 is implemented in one or more computer processors and an operational memory that includes data and/or computer-readable instructions to receive an item category and return one or more item categories that are bundled with the received item category. In one embodiment, a user interface module detects that a customer may be interested in a product that falls under an item category that has been bundled with one or more related item categories. In such a case, the user interface module queries affinity server 170 with the item category and affinity server 170 returns other associated item categories in one or more bundles. Such bundled categories may then be presented to the customer for purchase. In one embodiment, the customer may be offered a discount for purchasing at least one item from each of the categories in the presented bundle.

According to some embodiments, affinity server 170 is adapted to receive an item and/or an item category from a user interface module and return one or more items that fall under related bundled categories. Such items may be selected by analyzing demographic profiles of the particular customer and determining which item(s) within each bundled category has the closest relationship to the item and/or item category that was input from the user interface module. In this manner, the customer may be presented with an item from each category in a bundle. In other embodiments, items may be selected by analyzing a particular customer's transaction history and determining which particular items, within the bundled categories, the customer may be more likely to purchase. Such an analysis may include comparing affinities between transaction histories of other customers and the customer under analysis. In an embodiment, the customer may be offered a discount for purchasing every such presented item in the bundle.

Figure 3:
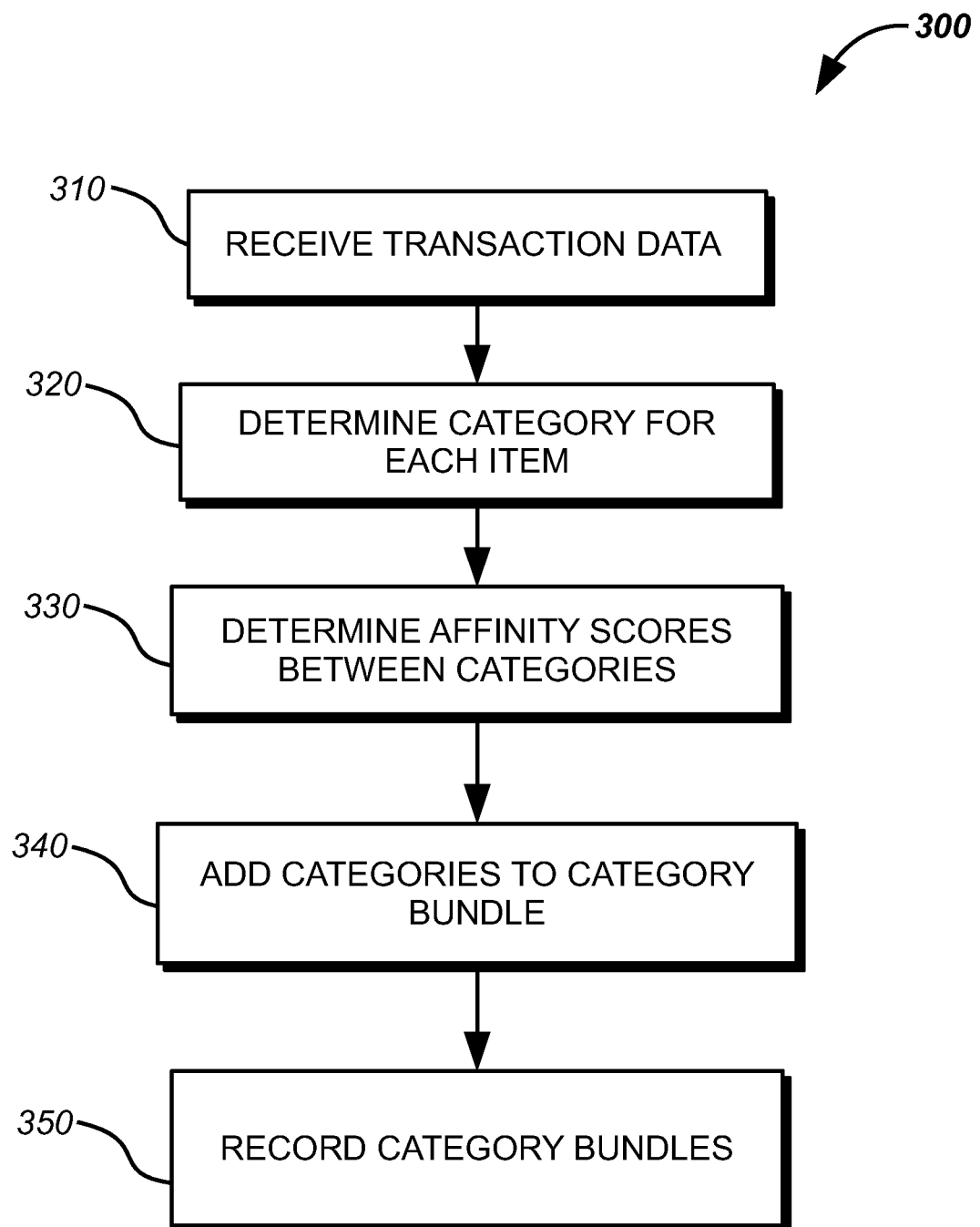
FIG. 3 is a flow chart illustrating a method for adding a category to a bundle according to an embodiment of the present disclosure.

In operation, product category clustering system 100 can detect relationships between categories of products and combine related categories into bundles. Products that fall into such related categories and that have detected relationships with selected customer demographic profiles may be offered to customers in a bundle. Referring now to FIG. 3, embodiments of the present disclosure comprise a method 300 for adding a category to a bundle. At operation 310, category affinity module 120 receives transaction data from transaction database 110. Received data may include transaction dates, items purchased, customer identifications, and the like. At operation 320, category affinity module 120 queries product database 110 to determine one or more categories for each item. At operation 330, category affinity module 120 analyzes the received data to determine an affinity score between various categories of items. In embodiments, the affinity score may be higher for item categories that were more often purchased together or close in time to each other. At operation 340, categories having an affinity score higher than a selected threshold are determined to share a category bundle. At operation 350, category bundles, including a list of constituent categories in each bundle, are recorded at product category list 130.

Figure 4:
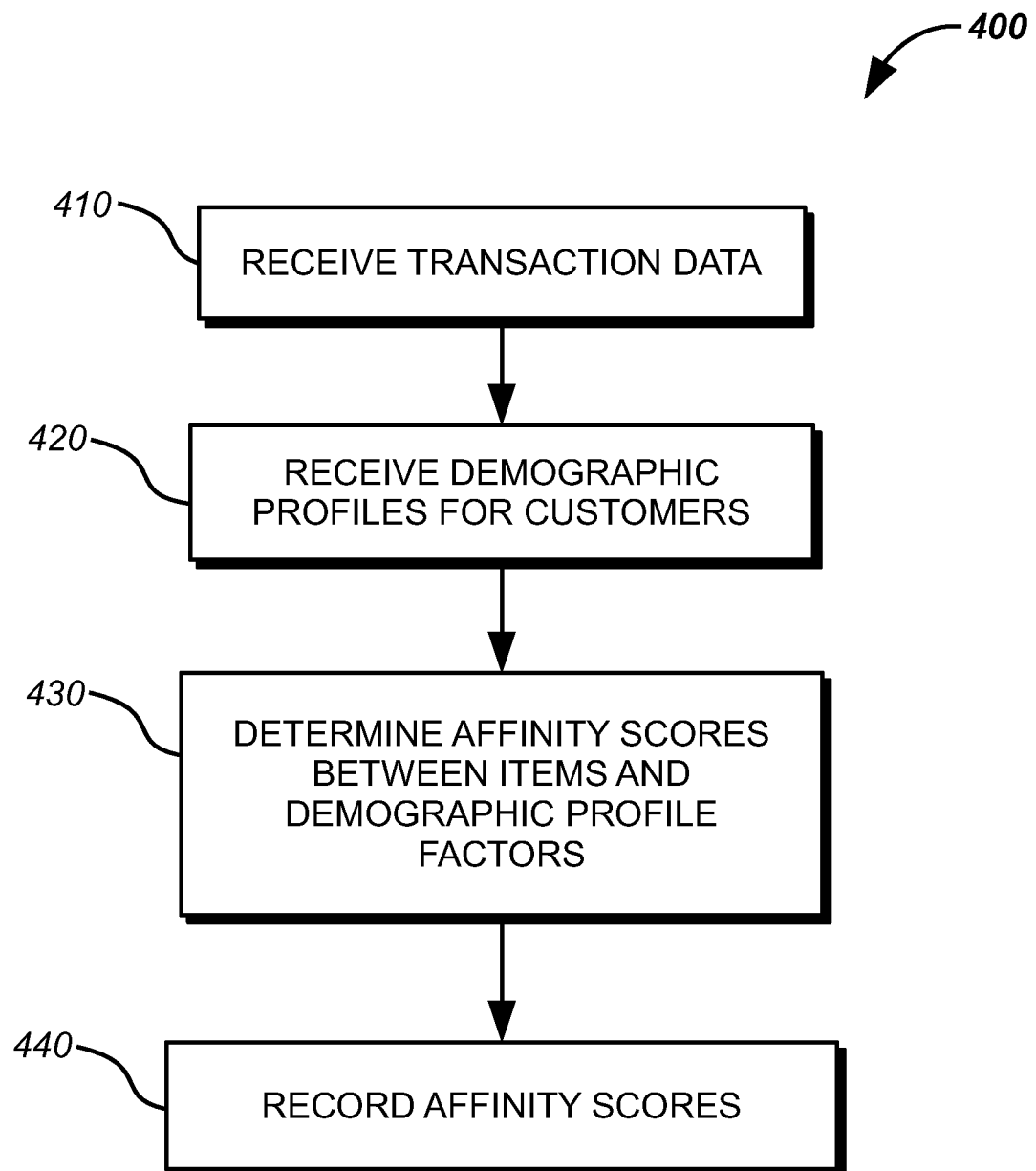
FIG. 4 is a flow chart illustrating a method for determining affinity between demographic factors and an item according to an embodiment of the present disclosure.

Referring now to FIG. 4, embodiments of the present disclosure comprise a method 400 for determining the affinity between a demographic profile factor and an item. At operation 410, item affinity module 150 receives transaction data from transaction database 110. Received data may include transaction dates, items purchased, and customer identification data. At operation 420, item affinity module 150 queries customer database 140 for demographic profile factors for each customer. At operation 430, item affinity module 150 analyzes the received data by determining an affinity score between various purchased items and customer demographic profile factors and various combinations of each. In embodiments, the affinity score may be higher for items that were more often purchased by customers having particular demographic profile factors. At operation 440, affinity scores for various demographic profile factors and related items are recorded at item affinity store 160.

Figure 5:
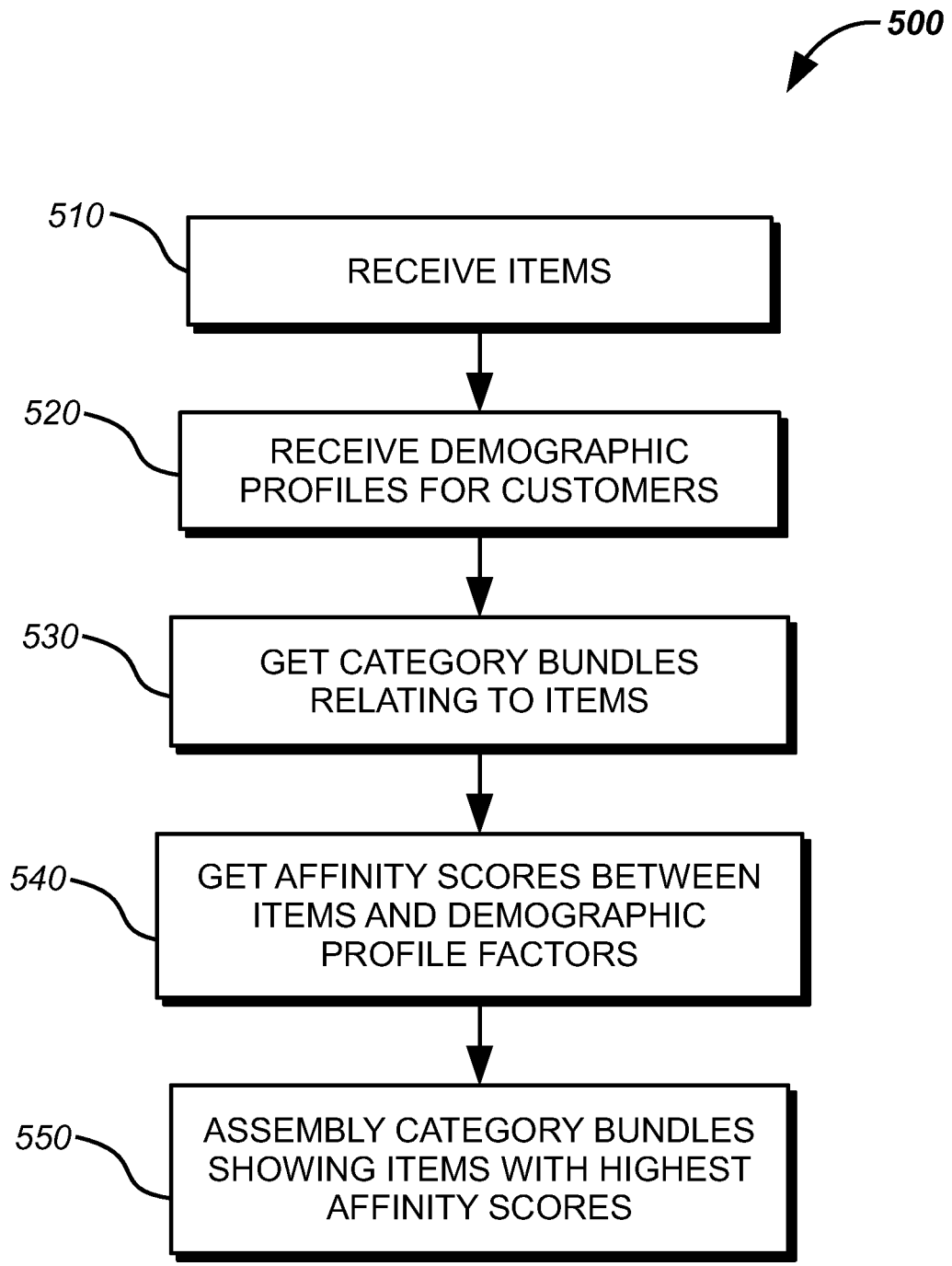
FIG. 5 is a flow chart illustrating an example method for providing a product bundle for a customer according to embodiments of the present disclosure.

Referring now to FIG. 5, embodiments of the present disclosure comprise a method 500 for providing a product bundle for a customer. At operation 510, affinity server 170 receives data regarding one or more items in which a customer may be interested. Such interest may be demonstrated by the customer viewing an item description on a retailer's website. Received data may include one or more categories into which the items of interest fall. At operation 520, affinity server 170 queries customer database customer database 140 regarding the customer and receives demographic profile factors describing the customer. At operation 530, affinity server 170 queries product category list 130 for one or more bundles of categories relating to the item(s) of interest and receives said category bundles. At operation 540, affinity server 170 queries item affinity store 160 and receives affinity scores for items in said category bundles with respect to the customer demographic profile factors. At operation 550, affinity server 170 assembles a list of products that are in the bundled categories and that have the highest affinity to the customer demographic profile factors. In an embodiment, the list of products comprises one product from each bundled category. In another embodiment, multiple products within each bundled category are included.

In one embodiment, the customer is offered the opportunity to purchase the bundle of items at a discount. In one embodiment, the customer is offered an incentive to purchase the bundle of items by offering, for example, free shipping for the purchased bundle. In one embodiment, the customer may select from multiple products within each bundled category and may be offered a discount by purchasing at least one item from each category.

A number of embodiments can include a system including one or more processors and one or more non-transitory computer-readable media storing computing instructions configured to run on the one or more processors and perform certain acts. The acts can include receiving transaction data comprising items previously purchased. The items previously purchased can include a first item having a first product type within a product category and a second item having a second product type within the product category. The acts also can include comparing the first item to the second item. The acts additionally can include identifying the first item to be related to the second item. The acts further can include aggregating the first product type and the second product type into a first category bundle having a first theme defined by the first and second product types. The acts also can include assigning a first affinity score to the first and second items based on the transaction data. The first affinity score can increase by a number of times the first and second items are purchased together. The acts further can include detecting the first item as being a first item of interest during one or more browsing sessions of a user on one or more websites of a retailer. When the first affinity score of the first item exceeds a threshold, the acts additionally can include displaying, to the user while browsing the one or more websites, the first category bundle comprising the first and second items.

Various embodiments can include a method being implemented via execution of computing instructions configured to run on one or more processors and stored at one or more non-transitory computer-readable media. The method can include receiving transaction data comprising items previously purchased. The items previously purchased can include a first item having a first product type within a product category and a second item having a second product type within the product category. The method also can include comparing the first item to the second item. The method additionally can include identifying the first item to be related to the second item. The method further can include aggregating the first product type and the second product type into a first category bundle having a first theme defined by the first and second product types. The method additionally can include assigning a first affinity score to the first and second items based on the transaction data. The first affinity score can increase by a number of times the first and second items are purchased together. The method also can include detecting the first item as being a first item of interest during one or more browsing sessions of a user on one or more websites of a retailer. When the first affinity score of the first item exceeds a threshold, the method further can include displaying, to the user while browsing the one or more websites, the first category bundle comprising the first and second items.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A system comprising:
one or more processors; and
one or more non-transitory computer-readable media storing computing instructions configured to run on the one or more processors and perform:
receiving, by a product category clustering system using the one or more processors, transaction data comprising items previously purchased, wherein the items comprise a first item having a first product type within a product category and a second item having a second product type within the product category, wherein the product category clustering system comprises a category affinity system, an affinity server, and an item affinity system;
comparing, by the product category clustering system, the first item to the second item;
identifying, by a first processor of the category affinity system, the first item to be related to the second item, wherein the category affinity system comprises the first processor and a first communication system;
aggregating, by the first processor of the category affinity system, the first product type and the second product type into a first category bundle having a first theme defined by the first and second product types;
assigning, by a second processor of the affinity server in data communication with a third processor of the item affinity system, a first affinity score to the first and second items based on the transaction data, wherein the first affinity score increases by a number of times the first and second items are purchased together, wherein the affinity server comprises the second processor and a second communication system;

querying, by the second processor of the affinity server, (i) a customer database for customer demographic profile factors within customer demographic profiles for one or more users, and (ii) a transaction database for the transaction data;

determining, by the third processor of the item affinity system, affinities between the customer demographic profile factors for the one or more users and the transaction data for respective ones of the items purchased together by the one or more users, wherein the item affinity system comprises the third processor and a third communication system;

assigning, by the second processor of the affinity server in data communication with the third processor of the item affinity system, respective affinity scores to the respective ones of the items based on the affinities, wherein the respective affinity scores increase by a number of times the respective ones of the items are purchased together;

detecting, by a user interface system using the third processor of the item affinity system, the first item as being a first item of interest for a user of the one or more users when the user views the first item of interest while browsing online webpages on one or more web sites of a retailer; and when the first affinity score of the first item exceeds a threshold, displaying, by the second communication system via the affinity server in data communication with the user interface system, to the user of the one or more users while browsing the one or more websites, the first category bundle comprising the first and second items.

2. The system of claim 1, wherein the computing instructions are further configured to run on the one or more processors and perform:

detecting, by the category affinity system, one or more shopping patterns of the one or more users from the one or more websites of the retailer, wherein a set of items of the items are (i) commonly purchased together or (ii) commonly found within the one or more shopping patterns of the one or more users, wherein the one or more shopping patterns comprise a purchasing pattern or a browsing pattern, and wherein the one or more shopping patterns are based on (i) the product category, (ii) a manufacturer, or (iii) a brand of the items;

detecting, by the category affinity system, one or more relationships between two or more of the items within the one or more shopping patterns of the one or more users; and determining, by the category affinity system, whether the first item of the items is related to the second item of the items based on a quantity of the one or more users that purchased the first item and the second item together.

3. The system of claim 1, wherein the computing instructions are further configured to run on the one or more processors and perform:

initiating, at a user interface system, (a) a query sent to the affinity server to match the first item of interest with one or more items of the items within the first category bundle, and (b) a further query sent to the affinity server to match the user of the one or more users with customer demographic profiles for the one or more users with an affinity for the first item of interest;

determining whether to display the first category bundle comprising the first item of interest to the user of the one or more users based on (a) when the first item of interest matches a particular item of the items within the product category and (b) when the user fits the customer demographic profiles for the one or more users with an affinity for the items within the product category associated with the first category bundle; and offering a discount for purchasing at least one respective item from the product category in the first category bundle displayed on the user interface system.

4. The system of claim 1, wherein displaying, to the user of the one or more users while browsing the one or more websites, the first category bundle further comprises:

transmitting a second category bundle, to the user, regarding a second item of interest of the items.

5. The system of claim 1, wherein the computing instructions are further configured to run on the one or more processors and perform:

providing, by the category affinity system, a bundle category limit, wherein the bundle category limit comprises a maximum quantity of one or more product categories; and when a quantity of the one or more product categories in the first category bundle exceeds the bundle category limit, removing a selected one of the one or more product categories from the first category bundle.

6. The system of claim 5, wherein:

removing, by the category affinity system, the selected one of the one or more product categories from the first category bundle comprises:

determining a sales volume of each respective one of the items within the selected one of the one or more product categories; and removing a selected one of the items within the selected one of the one or more product categories having a lowest sales volume within the first category bundle.

7. The system of claim 1, wherein the computing instructions are further configured to run on the one or more processors and perform:

identifying, by the affinity server, an affinity of at least one item from each respective product category of one or more product categories in the first category bundle by:

receiving a customer demographic profile of customer demographic profiles for the one or more users;

receiving multiple affinity scores reflecting degrees of affinity between multiple ones of the items and the customer demographic profiles for the one or more users, wherein the multiple ones of the items are described by at least one of the one or more product categories; and for each respective one of the one or more product categories, returning a selected one item from the items based on a respective affinity score of the multiple affinity scores for the selected one item.

8. The system of claim 1, wherein the first category bundle further comprises:

providing, by the item affinity system, the first affinity score for one or more product categories from one or more items of the items;

comparing, by the item affinity system, the first affinity score for the one or more product categories; and when the first affinity score exceeds an affinity threshold, adding, by the item affinity system, the one or more product categories to the first category bundle.

9. The system of claim 1, wherein the computing instructions are further configured to run on the one or more processors and perform:
    determining, by the product category clustering system using the transaction data from sales transactions, the first affinity score for the first item, wherein the first item is added to the product category when the first affinity score for the first item exceeds a pre-set threshold.

10. The system of claim 1, wherein the computing instructions are further configured to run on the one or more processors and perform:
    determining, by the category affinity system, whether the respective ones of the items are of a particular brand or a particular model within a respective product category.

11. A method being implemented via execution of computing instructions configured to run on one or more processors and stored at one or more non-transitory computer-readable media, the method comprising:
    receiving, by a product category clustering system using the one or more processors, transaction data comprising items previously purchased, wherein the items comprise a first item having a first product type within a product category and a second item having a second product type within the product category, wherein the product category clustering system comprises a category affinity system, an affinity server, and an item affinity system;
    comparing, by the product category clustering system, the first item to the second item;
    identifying, by a first processor of the category affinity system, the first item to be related to the second item, wherein the category affinity system comprises the first processor and a first communication system;
    aggregating, by the first processor of the category affinity system, the first product type and the second product type into a first category bundle having a first theme defined by the first and second product types;
    assigning, by a second processor of the affinity server in data communication with a third processor of the item affinity system, a first affinity score to the first and second items based on the transaction data, wherein the first affinity score increases by a number of times the first and second items are purchased together, wherein the affinity server comprises the second processor and a second communication system;
    querying, by the second processor of the affinity server, (i) a customer database for customer demographic profile factors within customer demographic profiles for one or more users, and (ii) a transaction database for the transaction data;
    determining, by the third processor of the item affinity system, affinities between the customer demographic profile factors for the one or more users and the transaction data for respective ones of the items purchased together by the one or more users, wherein the item affinity system comprises the third processor and a third communication system;
    assigning, by the second processor of the affinity server in data communication with the third processor of the item affinity system, respective affinity scores to the respective ones of the items based on the affinities, wherein the respective affinity scores increase by a number of times the respective ones of the items are purchased together;
    detecting, by a user interface system using the third processor of the item affinity system, the first item as being a first item of interest for a user of the one or more users when the user views the first item of interest while browsing online webpages on one or more web sites of a retailer; and
    when the first affinity score of the first item exceeds a threshold, displaying, by the second communication system via the affinity server in data communication with the user interface system, to the user of the one or more users while browsing the one or more websites, the first category bundle comprising the first and second items.

12. The method of claim 11, further comprising:
    detecting, by the category affinity system, one or more shopping patterns of the one or more users from the one or more websites of the retailer, wherein a set of items of the items are (i) commonly purchased together or (ii) commonly found within the one or more shopping patterns of the one or more users, wherein the one or more shopping patterns comprise a purchasing pattern or a browsing pattern, and wherein the one or more shopping patterns are based on (i) the product category, (ii) a manufacturer, or (iii) a brand of the items;
    detecting, by the category affinity system, one or more relationships between two or more of the items within the one or more shopping patterns of the one or more users; and
    determining, by the category affinity system, whether the first item of the items is related to the second item of the items based on a quantity of the one or more users that purchased the first item and the second item together.

13. The method of claim 11, further comprising:
    initiating, at a user interface system, (a) a query sent to the affinity server to match the first item of interest with one or more items of the items within the first category bundle, and (b) a further query sent to the affinity server to match the user of the one or more users with customer demographic profiles for the one or more users with an affinity for the first item of interest;
    determining whether to display the first category bundle comprising the first item of interest to the user of the one or more users based on (a) when the first item of interest matches a particular item of the items within the product category and (b) when the user fits the customer demographic profiles for the one or more users with an affinity for the items within the product category associated with the first category bundle; and
    offering a discount for purchasing at least one respective item from the product category in the first category bundle displayed on the user interface system.

14. The method of claim 11, wherein displaying, to the user of the one or more users while browsing the one or more web sites, the first category bundle further comprises:
    transmitting a second category bundle, to the user, regarding a second item of interest of the items.

15. The method of claim 11, further comprising:
    providing, by the category affinity system, a bundle category limit, wherein the bundle category limit comprises a maximum quantity of one or more product categories; and
    when a quantity of the one or more product categories in the first category bundle exceeds the bundle category limit, removing a selected one of the one or more product categories from the first category bundle.

16. The method of claim 15, wherein:
    removing, by the category affinity system, the selected one of the one or more product categories from the first category bundle comprises:

determining a sales volume of each respective one of the items within the selected one of the one or more product categories; and removing a selected one of the items within the selected one of the one or more product categories having a lowest sales volume within the first category bundle.

17. The method of claim 11, further comprising:

identifying, by the affinity server, an affinity of at least one item from each respective product category of one or more product categories in the first category bundle by:

receiving a customer demographic profile of customer demographic profiles for the one or more users;

receiving multiple affinity scores reflecting degrees of affinity between multiple ones of the items and the customer demographic profiles for the one or more users, wherein the multiple ones of the items are described by at least one of the one or more product categories; and for each respective one of the one or more product categories, returning a selected one item from the items based on a respective affinity score of the multiple affinity scores for the selected one item.

18. The method of claim 11, wherein the first category bundle further comprises:

providing, by the item affinity system, the first affinity score for one or more product categories from one or more items of the items;

comparing, by the item affinity system, the first affinity score for the one or more product categories; and when the first affinity score exceeds an affinity threshold, adding, by the item affinity system, the one or more product categories to the first category bundle.

19. The method of claim 11, further comprising:

determining, by the product category clustering system using the transaction data from sales transactions, the first affinity score for the first item, wherein the first item is added to the product category when the first affinity score for the first item exceeds a pre-set threshold.

20. The method of claim 11, further comprising:

determining, by the category affinity system, whether the respective ones of the items are of a particular brand or a particular model within a respective product category.

* * * * *